July 16, 1963  E. M. STONER  3,097,982
METHOD OF FABRICATING AIRFOILS
Filed June 6, 1960  2 Sheets-Sheet 1
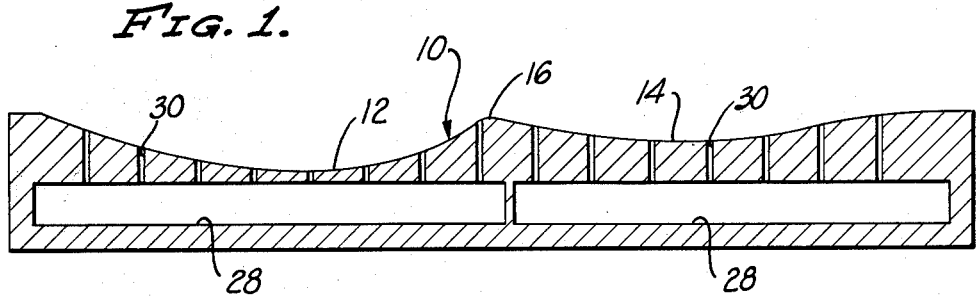
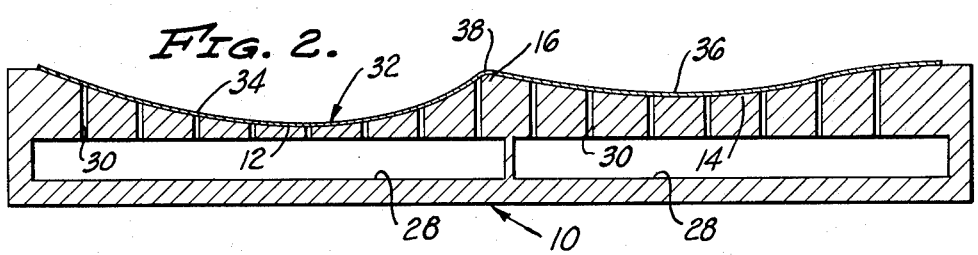
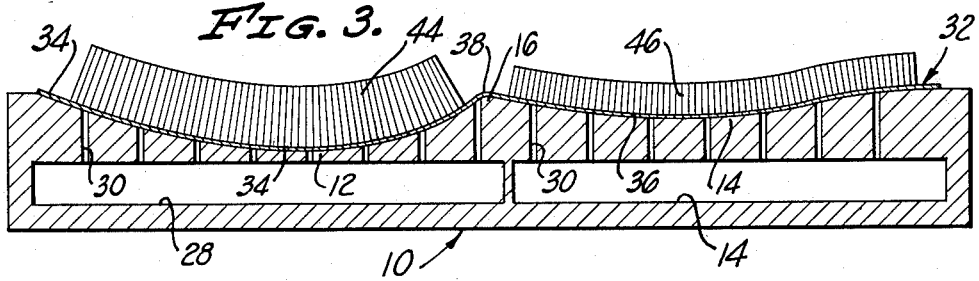
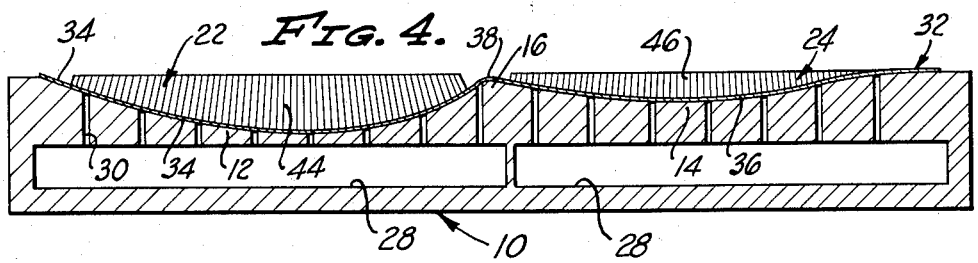
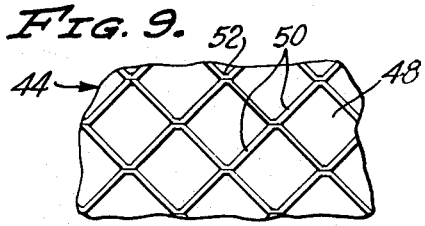
INVENTOR.
EUGENE M. STONER
BY
Thomas P. Mahoney
ATTORNEY July 16, 1963 E. M. STONER 3,097,982
METHOD OF FABRICATING AIRFOILS
Filed June 6, 1960 2 Sheets-Sheet 2
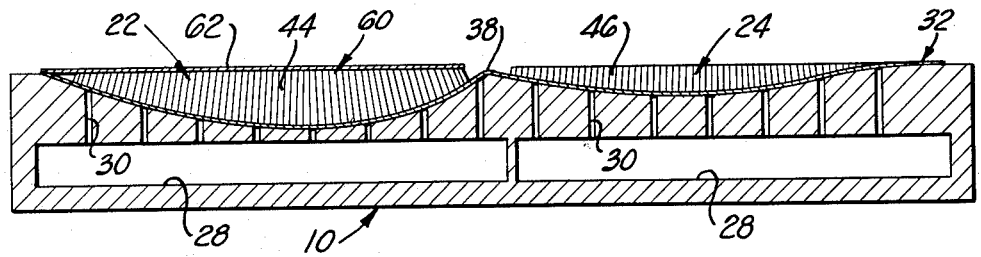
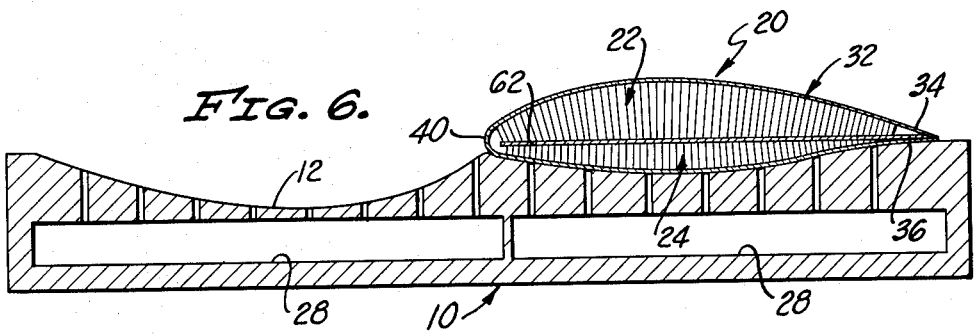
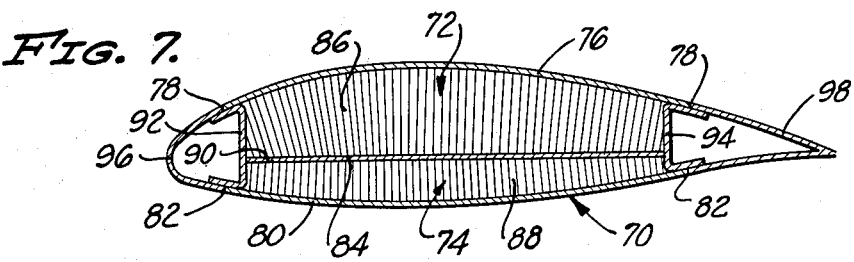
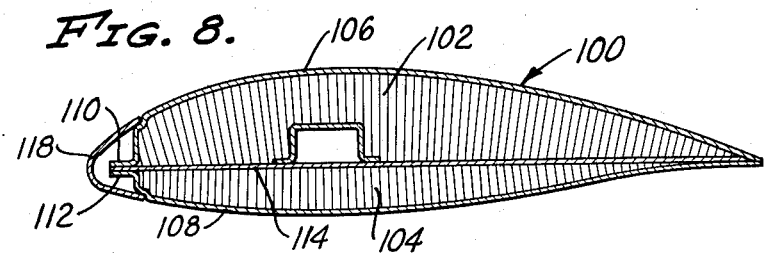
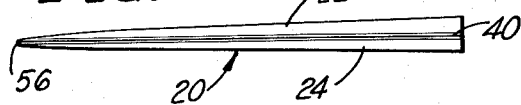
INVENTOR.
EUGENE M. STONER
BY Thomas P. Mahoney
ATTORNEY United States Patent Office 3,097,982
Patented July 16, 1963

3,097,982
METHOD OF FABRICATING AIRFOILS
Eugene M. Stoner, 1707 Tradewinds Lane, Newport Beach, Calif.
Filed June 6, 1960, Ser. No. 34,058
6 Claims. (Cl. 156—211)

This invention relates to a method for fabricating airfoils and, more particularly, to a method of fabricating airfoils utilizing honeycomb core reinforcing material.

In describing the application of the steps of the method in fabricating an airfoil, particular reference will be had to the fabrication of a typical wing section, but it is, of course, to be understood that the method of the invention may be applied with equal efficacy to various other types of airfoil sections such as horizontal and vertical stabilizers, ailerons, flaps, tabs, and the like. Moreover, various other types of equivalent airfoil structures such as rotor blades and propellers may be fabricated by the teachings of the invention and it is not intended that the invention be limited to the fabrication of any particular type or configuration of airfoil.

Many attempts have been made in the past to eliminate the complex structural reinforcements customarily incorporated in conventional airfoils. In large airfoils, such as wings and vertical and horizontal stabilizers, the problems of fabrication inherent in the use of conventional rib and spar structures have increased as the wing and other loadings imposed thereupon have correspondingly increased. Moreover, such conventional airfoil structures entail the utilization of large amounts of expensive material, are quite heavy, and consume many hours of skilled labor during their fabrication.

It is, therefore, an object of my invention to provide a method for fabricating an airfoil structure which eliminates many of the complexities inherent in conventional airfoil fabrication by fabricating the components of the airfoil structure in a unitary manner and eliminating the necessity for the incorporation therein of the large number of component parts frequently utilized in the manufacture of airfoils in accordance with conventional prior art techniques.

The teachings of my invention are applicable to the fabrication of the entire airfoil or to the fabrication thereof in sections which may be subsequently secured or affixed to each other by various techniques. Furthermore, if desired, certain conventional elements, such as front and rear spars, can be utilized in conjunction with the previously fabricated airfoil sections, as will be apparent from the description of the method appearing in detail hereinbelow.

In any event, the application of the method of my invention entails the utilization of a die or form structure in which the skin or a portion of the skin of the airfoil is located. Of course, the skin referred to herein is the external covering of the airfoil and can consist of various types of materials such as sheet metal, including aluminum and stainless steel, and various types of plastic impregnated fabrics and fibers such as a glass fabric and glass in fibrous form. Such glass fabrics or glass fibers may be impregnated with various types of phenolic or similar resins which can be utilized during the process in the partially cured state, as will be apparent from the discussion appearing in detail hereinbelow.

After the disposition of the aforesaid skin or portion of the skin of the airfoil in a corresponding cavity of the associated die, said cavity being configured to the external configuration of the desired external surface of the airfoil, the skin is urged into contact with the adjacent die surface. Where a wing or similar airfoil is being fabricated, the taper of the wing from the leading edge to the trailing edge thereof is incorporated in the die cavity as is also the taper from thet root to the tip of the wing.

After the deposition and adjustment of the skin has taken place, a layer of honeycomb core material of conventional square or hexagonal cell configuration is located in the die with its lower surface in contiguity to the exposed surface of the section of skin disposed within the die. Subsequently, the layer of honeycomb core material is secured to the adjacent surface of the skin. There is a wide variety of means which may be utilized to accomplish such securement which will be discussed in greater detail hereinbelow. However, after such securement has taken place, the upper surface of the layer of honeycomb core material is cut away by the utilization of various types of cutting saws or milling tools to provide a substantially planar surface upon said layer.

After this step has been accomplished, the one section of the airfoil has been completely fabricated and said one section can be secured to a correspondingly formed airfoil section by the juxtaposition of the co-planar surfaces of the layers of honeycomb core reinforcement to each other and the securement thereof to each other by various expedients which will be described in greater detail hereinbelow.

The utilization of the teachings of my invention eliminates many of the processes and steps which must be followed in conventional airfoil fabrication and thus reduces the cost of airfoil fabrication while providing a product which is superior in many respects to conventional airfoil structures.

Other objects and advantages of the invention will be apparent from the following specification and the accompanying drawings which are for the purpose of illustration only, and in which:

FIG. 1 is a transverse, sectional view of a typical composite die utilized in accordance with the teachings of the invention;

FIG. 2 is a view similar to FIG. 1 showing the deposition in adjacent cavities of the aforesaid die of adjacent portions of the surface skin of an airfoil to be fabricated in said die;

FIG. 3 is a view similar to FIG. 2 showing the deposition upon the upper surfaces of the adjacent portions of the external skin of the aircraft of layers of honeycomb core reinforcing material;

FIG. 4 shows the manner in which the protruding portions of the upper surfaces of the layers of honeycomb core material may be cut or otherwise removed to provide corresponding co-planar surfaces on said layers;

FIG. 5 illustrates an alternative step of incorporating a load distributing diaphragm or member in conjunction with one of the airfoil sections;

FIG. 6 illustrates the manner in which the two sections of the airfoil may be operatively secured to each other;

FIG. 7 discloses an alternative airfoil configuration which may be manufactured in accordance with the teachings of the invention;

FIG. 8 is illustrative of still another form of airfoil construction which may be fabricated in accordance with the teachings of the invention;

FIG. 9 is a top plan view of a substantially square cell honeycomb core reinforcing material utilized in practicing the teachings of the invention; and FIG. 10 is a view illustrating a typical airfoil profile, such as a wing panel, which may be fabricated by the utilization of the teachings of the invention.

Referring to the drawings and particularly to FIG. 1 thereof, I show a die 10 which is typical of the type of die which may be utilized in the practice of the method of the invention. Of course, it will be realized by those skilled in the art that various types of dies or forms may be utilized in the practice of the method and it is not intended that the invention be limited to the use of any particular type of die.

The die 10 includes adjacent die cavities 12 and 14 which are separated from each other by an intermediate hump or rib 16. The die 10 may be of a length sufficient to permit the formation of an entire airfoil such as the wing 20 shown in FIG. 10 of the drawings. When intended to form an entire airfoil such as the wing 20, the cavities 12 and 14 will be configured to conform substantially to the opposite, external surfaces of the airfoil, such as the top and bottom surfaces of the wing 20. In the present instance, the cavity 12 is utilized to fabricate the top section 22 of the wing 20 and the cavity 14 is utilized to fabricate the bottom section 24 of the wing 20, said wing 20 being illustrated in cross section in FIG. 6 of the drawings.

The die 10 is characterized by the provision of vacuum chambers 28 which are connected to an exhaust pump, not shown, and which communicate with the die cavities 12 and 14 through ports 30. Therefore, when the external skin 32 of an airfoil, such as the wing 10, is laid in overlying relationship with the die with adjacent portions or sections 34 and 36 thereof disposed respectively in the die cavities 12 and 14, the vacuum exerted upon the lower surface of each of the portions 34 and 36 of the external skin 32 through the ports 30 will cause the portions of the skin 32 to be moved into juxtaposition to the adjacent surfaces of the die cavities 12 and 14 to insure that they are configured in accordance with the configuration of the die cavities and, thus, in accordance with the external configuration of the airfoil 10. It will be noted that, in the present case, the intermediate portion 38 of the skin 32 constitutes the leading edge 40 of the wing 20.

The skin 32 can be fabricated from various types of light gauge sheet metal such as aluminum or stainless steel. If desired, the skin can be fabricated from various types of fabrics, such as glass fiber fabric or from glass fibers impregnated with various types of synthetic plastics. Typical plastics which may be utilized in impregnating glass fiber cloth or glass fiber material are the phenolic and silicone resins. If synthetic plastic impregnated fabrics or fibers are utilized as the skin 32, they are customarily applied in the "B stage" or semi-cured state, while they are still subject to being deformed into juxtaposition to the walls of the die cavities 12 and 14.

After the skin 32 of the aircraft has been caused to move into contiguity with the wall of the associated die cavity 12 or 14, a layer of honeycomb core reinforcing material 44 is superimposed on the first portion 34 of the skin 32 and a similar layer 46 of honeycomb core reinforcing material is superimposed upon the second section 36 of skin 32. While I have described the utilization of two separate layers 44 and 46 of honeycomb core reinforcing material, due to the substantial difference in the thickness of the material which must be utilized, it is conceivable that a single layer of material of uniform thickness might be utilized in place of the two separate layers 44 and 46 where there was not too great a discrepancy in the depth of the respective die cavities.

In any event, it will be noted that the thickness of both layers 44 and 46 of honeycomb core reinforcing material is sufficient to fill the deepest portions of the die cavities and, thus, the deepest portions of the skin sections 34 and 36 deposited in said cavities.

The honeycomb core layers are typified, as best shown in FIG. 9 of the drawings, by a plurality of cell structures 48, said cell structures being formed by superimposed or juxtaposed core strips 50 which are corrugated and which are connected to each other at adjacent nodes 52 by various means such as various types of organic and synthetic adhesives and also, in the case of various metals, by brazing, welding or the like.

As a matter of fact, there are many types of materials which are now fabricated into honeycomb core reinforcing structures of the character of that shown in FIG. 9 of the drawings. For instance, it is possible to obtain honeycomb core fabricated from various types of papers or cloths impregnated with various types of synthetic plastics such as the phenolic resins or the silicones.

When resin impregnated paper is utilized to fabricate the honeycomb core layers 44 and 46, a coating of a suitable adhesive such as a synthetic plastic adhesive of the phenolic type is applied to the upper surface of each of the adjacent skin portions or sections 34 and 36 in order that the adhesive may serve as a suitable means of bonding or securing the undersurface of each of the layers 44 and 46 to the associated surface of the juxtaposed skin portion or section 34 or 36.

Of course, various types of sheet metal foils are also utilized to fabricate honeycomb core reinforcing material. Typical of these are aluminum and stainless steel foils which may be secured to each other by the utilization of various types of synthetic adhesives derived, for example, from the phenolic and like resins, or from various types of high temperature ceramic adhesives.

In addition, brazing techniques may be utilized to secure the individual core strips of a sheet metal core fabricated from aluminum or stainless steel foil to each other. In some cases, resistance welded core strips are utilized to fabricate the honeycomb core reinforcing structure. In high temperature applications, particularly, it is desirable to use sheet metal honeycomb core reinforcing layers 44 and 46. In such cases, instead of utilizing the conventional synthetic plastic adhesives adverted to hereinabove, it is customary to utilize various types of well-known brazing pastes or to utilize various types of high temperature adhesives which may be either thermo-setting or room temperature setting depending upon the constituent elements thereof.

If the application of heat is necessary to set the adhesives or brazing materials utilized in the affixation or securement of the layers 44 and 46 of honeycomb core material to the respective surfaces of the adjacent portions 34 and 36 of the external skin 32, suitable heating means may be incorporated in the die 10. Such conventional heating means may be in the form of steam manifolds or electrical resistance cables embodied in the die 10 and adapted to sufficiently raise the temperature of the die surfaces adjacent the skin 32 to cure the particular adhesive used. If desired, air bags or other conventional expedients can be applied to the upper surfaces of the core layers 44 and 46 to insure that the proper pressure is applied to the core layers 44 and 46 during the curing process.

It is also conceivable that, in the case of stainless steel honeycomb core material, the honeycomb core layers 44 and 46 may be secured to the upper surface of each of the portions 34 and 36 of the external skin 32 by the utilization of resistance welding techniques. In this manner the attainment of a high strength bond between the core layers 44 and 46 results and the necessity for the utilization of auxiliary adhesives or brazing paste is eliminated.

After the core layers 44 and 46 have been suitably secured or affixed or bonded to the surfaces of the respective skin portions 34 and 36, the portions of the core layers 44 and 46 which project above and out of the die cavities 12 and 14 are removed by the use of various types of cutters. For instance, it is possible to remove the protruding portions of the layers 44 and 46 by the use of high speed rotary or band saws or by the use of newly developed electrical machining and cutting techniques. The ultimate end to be achieved is the provision of substantially planar surfaces on the exposed upper surfaces of the core layers 44 and 46.

After the creation of such substantially planar surfaces on the core layers has been accomplished, the top section 22 of the wing 20 may be rotated into overlying relationship with the bottom section 24 of said wing. Such mating of the top and bottom sections of the wing 20 is accomplished subsequently to the application of a suitable adhesive or bonding material to the upper surfaces of the layers 44 and 46 of core material.

Once the co-planar surfaces of the core layers 44 and 46 have been brought into contiguity with each other the adhesives or other bonding materials can be subjected to suitable curing temperatures if necessary. Of course, when such mating of the top and bottom sections 22 and 24 of the wing 10 has been accomplished, the leading edge 40 may be filled, if desired, with a suitable filler material such as a foamed plastic or the like. In addition, the overlying portions of the external skin 32 may be secured to each other at the trailing edge of the wing 20 to provide a completely closed airfoil. If desired, the wing tip 56 can be fabricated by the securement of the adjacent overlying portions 34 and 36 to each other at the tip 56.

In the practice of the method of my invention it is sometimes desirable to utilize a load distributing member 60 constituted by a suitably shaped panel 62, as best illustrated in FIGS. 5 and 6 of the drawings, to distribute the loads from the top section 22 to the bottom section 24 of the wing 20. The load distributing member 60 can be fabricated from any desired material and usually is fabricated from a material similar or identical to that utilized in fabricating the layers 44 and 46 of core material.

In any event, prior to the joining of the top and bottom sections 22 and 24 of the wing 20, the load distributing member 60 is secured to the layer 44 or the layer 46 of core material by the use of an appropriate adhesive. After this has been accomplished a similar coating of adhesive is applied to the upper surface of the load distributing member 60 and the top section 22 of the wing 20 is then rotated into overlying relationship with the bottom section 24 of the wing 20.

The use of the load distributing member serves to insure the positive affixation of the upper surfaces of the core layers 44 and 46 to each other. Moreover, it insures that forces imposed upon one of the segments 22 or 24 of the wing 20 will be transmitted effectively into the associated section.

It should be noted that, where the skin 32 is fabricated from a sheet or batt of fibrous material impregnated with a thermosetting synthetic plastic, after the first and second sections 22 and 24 of the wing 20 have been juxtaposed to each other, the entire assembly can be subjected to heat and pressure to cure the skin 32 and also to cure whatever uncured plastic adhesives may remain in the body of the wing 20.

An alternative form of airfoil structure 70 is shown in FIG. 7 of the drawings wherein the top section 72 and the bottom section 74 of the airfoil 70 are fabricated as separate units, the external skin 76 of the top section 72 terminating at juncture lines 78 and the bottom section 74 having its external skin 80 terminating at juncture lines 82.

Therefore, the top and bottom sections 72 and 74 may be fabricated in separate dies and joined to each other at the interface 84 between the respective foil layers 86 and 88 thereof by the load distributing member or diaphragm 90. The airfoil structure 70 is characterized by the utilization of a forward spar 92 and a rear spar 94 which may be fabricated from suitable material, such as extruded aluminum sections, or which may be fabricated, in the case of a wing formed entirely from plastic impregnated materials, from a plastic impregnated cloth or fiber. In any event, the front spar 92 and rear spar 94 may then be secured by the use of suitable adhesives to the front and rear ends of the assembled sections 72 and 74 of the airfoil 70. After this has been accomplished, a leading edge portion 96 is secured to the front spar 92 and a trailing edge portion 98 is secured to the rear spar 94.

An alternative form of airfoil 100 is shown in FIG. 8 of the drawing and differs from the wing 10 in that the top and bottom sections 102 and 104 have been formed as separate units with the external skins 106 and 108 thereof being joined to each other at the forward edge by mating flanges 110 and 112 which are secured to a projecting portion of the load bearing member 114. Similarly, the trailing edges of the skins 106 and 108 are secured to each other and to an adjacent portion of the load bearing member 114. A nose cap 118 is secured in overlying relationship with the mating flanges 110 and 112 to impart an airfoil configuration to the airfoil 100.

As will be readily apparent to those skilled in the art, a wide variety of different types and shapes of airfoil may be fabricated by the application of the teachings of the invention and it is not intended that the method of the invention be limited to the fabrication of any of the particular embodiments of airfoils shown and discussed herein since it is manifest that various modifications in the size, shape and structure of the airfoils fabricated by the teachings of the invention may be made without departing from the spirit thereof.

However, it is possible by the application of the teachings of the invention to fabricate an airfoil structure which is substantially unitary in character and which eliminates the necessity for many of the hand operations customarily entailed in the fabrication of even the simplest type of airfoil. In addition, the complex engineering and numerous structural elements which are entailed in conventional airframe structures and, particularly, wing structures, are eliminated by the practice of the teachings of the invention.

Of course, one of the principal advantages derived from the utilization of the method of the invention in the fabrication of airfoils, other than the obvious advantage of reduction in manufacturing costs and labor expenditures, is the provision of an airfoil characterized by a smoother external contour than can be achieved by the utilization of conventional fabricating techniques. Those skilled in the art are cognizant of the fact that, at the present time, large airfoils, in particular, are characterized by the presence of surface irregularities and dimples or depressions which detract from the aerodynamic efficiency of the airfoils.

The achievement of precisely contoured airfoils has become particularly significant in view of the high wing loadings, high speeds and laminar flow designs which are presently utilized in aircraft. Since the external configurations of airfoils fabricated by the teachings of my invention are die-formed in dies having the precise configuration of the external surfaces of the airfoils, ultimate precision within close dimensional tolerances is achieved.

Furthermore, while I have described the method of my invention as applied to the fabrication of airfoils, it is conceivable that various types of contoured structures may be fabricated by the application of the steps of the method of the invention. For instance, missile and wing tip nose configurations may be fabricated where the nose configurations are designed to incorporate structural reinforcing members. Other applications of the method of the invention will readily occur to those skilled in the art.

I claim:

1. In a method of fabricating a honeycomb core reinforced airfoil, the steps of: placing portions of the external skin of said airfoil in overlying relationship with adjacent dies incorporating cavities having configurations correspondng to the configuration of opposite sides of said airfoil; urging said portions of said skin into contact with the wall of the associated die cavity to cause said portions to assume the configuration thereof; placing a layer of honeycomb core material in overlying relationship with each of said skin portions; disposing the lower surface of the layer of honeycomb core material in contiguity with the upper surface of said associated skin portion; securing the lower surface of said honeycomb core layer to said associated skin portion; removing portions of the upper surface of the layer associated with each skin portion to provide co-planar mating surfaces thereupon; lifting one of said skin portions and the associated core layer out of the associated die cavity and rotating it into a position where the planar surface of said core layer engages the corresponding planar surface of the core layer associated with said other skin portion; and bonding the adjacent surfaces of said core layers to each other.

2. In a method of fabricating an airfoil characterized by a taper from the root to the tip thereof, the steps of: depositing adjacent portions of the external skin of said airfoil in adjacent die cavities whose configuration conforms to the ultimate configuration of the exterior surfaces of said airfoil, with the intermediate portion of said external skin defining the leading edge portion of said airfoil; urging the lower surfaces of said adjacent portions of said external skin into contiguity to the surfaces of said die cavities; depositing layers of honeycomb core reinforcing material in said die cavities, said layers of honeycomb core material being of sufficient depth to fill the deepest portions of said die cavities; securing the undersurface of each of said layers of material to the corresponding surface of the adjacent portion of external skin; removing portions of said core layers protruding above the confines of said cavities to provide substantially planar surfaces upon said layers of honeycomb core reinforcing material; rotating one of said portions of said surface skin into overlying relationship with the other portion thereof to engage the substantially planar surfaces of said honeycomb core layers with each other; and securing the adjacent surfaces of said honeycomb core layers to each other.

3. In a method of fabricating an airfoil characterized by a uniform taper from the leading to the trailing edge thereof and from the root to the tip thereof, the steps of: depositing adjacent portions of the external skin of said airfoil in adjacent die cavities whose configuration conforms to the ultimate configuration of the exterior surfaces of said airfoil, with the intermediate portion of said external skin defining the leading edge portion of said airfoil; urging the lower surfaces of said adjacent portions of said external skin into contiguity to the surfaces of said die cavities; depositing layers of honeycomb core reinforcing material in said die cavities, said layers of honeycomb core material being of sufficient depth to fill the deepest portions of said die cavities; securing the undersurface of each of said layers of material to the corresponding surface of the adjacent portion of external skin; removing portions of said core layers protruding above the confines of said cavities to provide substantially planar surfaces upon said layers of honeycomb core reinforcing material; affixing a load distributing member to the upper surface of one of said core layers; rotating the other core layer into overlying relationship with the exposed surface of said load distributing member; and securing said other core layer to said surface of said load distributing member.

4. In a method of fabricating an airfoil having a reinforcing core of honeycomb configuration, the steps of: placing an external skin for the top section of said airfoil in overlying relationship with a die cavity having a configuration corresponding to said top section of said airfoil; moving said external skin into engagement with the corresponding die cavity surface; locating a layer of honeycomb core material in overlying relationship with said external skin for said top section; bonding the lower surface of said honeycomb material to the inner surface of said external skin for said top section; removing protruding portions of the upper surface of said layer of honeycomb core material to provide a planar surface on the upper surface of said layer; placing an external skin for the bottom section of said airfoil in overlying relationship with a die cavity having a configuration corresponding to said bottom section of said airfoil; moving said external skin for said bottom section into engagement with the corresponding die cavity surface; locating a layer of honeycomb core material in overlying relationship with said skin for said bottom section; bonding the lower surface of the layer of honeycomb material to the inner surface of said layer of skin for said bottom section; removing protruding portions of the upper surface of said layer of honeycomb core material on said external skin for said bottom section to provide a planar surface on the upper surface of said layer; and bonding said planar surfaces of said core layers to each other to secure said top and bottom sections of said airfoil to each other.

5. In a method of fabricating an airfoil having a reinforcing core of honeycomb configuration, the steps of: placing an external skin for the top section of said airfoil in overlying relationship with a die cavity having a configuration corresponding to said top section of said airfoil; moving said external skin into engagement with the corresponding die cavity surface; locating a layer of honeycomb core material in overlying relationship with said external skin for said top section; bonding the lower surface of said honeycomb material to the inner surface of said external skin for said top section; removing protruding portions of the upper surface of said layer of honeycomb core material to provide a planar surface on the upper surface of said layer; placing an external skin for the bottom section of said airfoil in overlying relationship with a die cavity having a configuration corresponding to said bottom section of said airfoil; moving said external skin for said bottom section into engagement with the corresponding die cavity surface; locating a layer of honeycomb core material in overlying relationship with said skin for said bottom section; bonding the lower surface of the layer of honeycomb material to the inner surface of said layer of skin for said bottom section; removing protruding portions of the upper surface of said layer of honeycomb core material on said external skin for said bottom section to provide a planar surface on the upper surface of said layer; interposing a flat, load distributing diaphragm between the planar surfaces of the honeycomb core layers of said top and bottom sections; and adhesively securing said core layers of said top and bottom sections to the opposite sides of said diaphragm.

6. In a method of fabricating an airfoil having a reinforcing core of honeycomb configuration, the steps of: placing an external skin for the top section of said airfoil in overlying relationship with a die cavity having a configuration corresponding to said top section of said airfoil; moving said external skin into engagement with the corresponding die cavity surface; locating a layer of honeycomb core material in overlying relationship with said external skin for said top section; bonding the lower surface of said honeycomb material to the inner surface of said external skin for said top section; removing protruding portions of the upper surface of said layer of honeycomb core material to provide a planar surface on the upper surface of said layer; placing an external skin for the bottom section of said airfoil in overlying relationship with a die cavity having a configuration corresponding to said bottom section of said airfoil; moving said external skin for said bottom section into engagement with the corresponding die cavity surface; locating a layer of honeycomb core material in overlying relationship with said skin for said bottom section; bonding the lower surface of the layer of honeycomb material to the inner surface of said layer of skin for said bottom section; removing protruding portions of the upper surface of said layer of honeycomb core material on said external skin for said bottom section to provide a planar surface on the upper surface of said layer; interposing a flat, load distributing diaphragm between the planar surfaces of the honeycomb core layers of said top and bottom section; adhesively securing said core layers of said top and bottom sections to the opposite sides of said diaphragm; affixing a leading edge to said top and bottom sections; and affixing a trailing edge to said top and bottom sections.

References Cited in the file of this patent

UNITED STATES PATENTS

| | | |
|---|---|---|
| 1,913,459 | Skillman et al. | June 13, 1933 |
| 2,699,598 | Daugherty | Jan. 18, 1955 |
| 2,742,387 | Giuliani | Apr. 17, 1956 |
| 2,796,033 | Feinstein | June 18, 1957 |
| 2,855,664 | Griffith et al. | Oct. 14, 1958 |
| 2,956,651 | Allred et al. | Oct. 18, 1960 |
| 2,988,809 | Hall | June 20, 1961 |